(12) United States Patent
Akiyama et al.

(10) Patent No.: US 11,009,915 B1
(45) Date of Patent: May 18, 2021

(54) ELECTRONIC APPARATUS

(71) Applicant: LENOVO (SINGAPORE) PTE. LTD., Singapore (SG)

(72) Inventors: Sara Akiyama, Yokohama (JP); Masayuki Amano, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/856,189

(22) Filed: Apr. 23, 2020

(30) Foreign Application Priority Data

Jan. 8, 2020 (JP) .............................. JP2020-001234

(51) Int. Cl.
*G06F 1/16* (2006.01)

(52) U.S. Cl.
CPC .......... *G06F 1/1656* (2013.01); *G06F 1/1616* (2013.01)

(58) Field of Classification Search
CPC .... G06F 1/1601; G06F 1/1613; G06F 1/1616; G06F 1/1633; G06F 1/166; H05K 5/0234
USPC ........................................ 361/679.02, 679.59
See application file for complete search history.

(56) References Cited

U.S. PATENT DOCUMENTS

| | | | |
|---|---|---|---|
| 10,721,829 B1* | 7/2020 | Bowers | H05K 5/03 |
| 2008/0253081 A1* | 10/2008 | Tracy | G06F 1/1616 |
| | | | 361/679.5 |
| 2009/0175001 A1* | 7/2009 | Mathew | A47B 91/00 |
| | | | 361/679.59 |
| 2009/0180268 A1* | 7/2009 | Guo | F16F 1/44 |
| | | | 361/810 |
| 2011/0090623 A1* | 4/2011 | Liu | G06F 1/1616 |
| | | | 361/679.01 |
| 2011/0102981 A1* | 5/2011 | Chen | F16M 13/00 |
| | | | 361/679.01 |
| 2015/0070838 A1* | 3/2015 | Casebolt | H05K 5/0234 |
| | | | 361/679.55 |
| 2020/0019214 A1* | 1/2020 | Mangum | G06F 1/1656 |

FOREIGN PATENT DOCUMENTS

JP 2017045853 A 3/2017

\* cited by examiner

*Primary Examiner* — Anthony Q Edwards
(74) *Attorney, Agent, or Firm* — Shimokaji IP

(57) ABSTRACT

An electronic apparatus includes a chassis, a lower cover member constituting the bottom surface of the chassis, and a foot member provided projecting from the surface of the lower cover member. The foot member includes a metal core member having a bar shape and extending along one edge of the lower cover member, and a rubber or resin skin member provided on the surface of the core member.

9 Claims, 6 Drawing Sheets

ELECTRONIC APPARATUS

FIELD OF THE INVENTION

The present invention relates to an electronic apparatus.

BACKGROUND OF THE INVENTION

For example, Japanese Patent No. 6212522 discloses an electronic apparatus, such as a laptop PC, or the like, of which a chassis typically includes an upper cover member constituting an upper surface where a keyboard device is provided and a lower cover member constituting a bottom surface, the upper cover member being stacked on, and connected to, the lower cover member such that the chassis has a low-profile box shape.

SUMMARY OF THE INVENTION

There is a strong need for reduction in thickness of such an electronic apparatus as one described above. Thus, it is desired to reduce the thickness of the lower cover member as well that constitutes the bottom surface of the chassis. A thin lower cover member, however, increases a concern that the lower cover member may be warped and deformed. Should the lower cover member warp, the bottom surface of the chassis curves, which makes the electronic apparatus placed on a table or the like unstable. In view of the above, the structure disclosed in the above-mentioned Japanese Patent No. 6212522 has upstanding walls provided along the four circumferential edges of the lower cover member. This can suppress the problem of warped deformation of a thin lower cover member, such as is described above, to some extent. Nevertheless, further reduction in thickness of a lower cover member is demanded, and, to meet this demand, a structure like a flat plate without an upstanding wall along all or some of the four circumferential edges is considered. Such a structure, however, likely causes warped deformation as described above, and controlling such a warp is difficult to be achieved properly.

The present invention has been conceived in consideration of the above-described problem of conventional techniques, and aims to provide an electronic apparatus whose lower cover member, constituting the bottom surface of a chassis, is less deformable.

An electronic apparatus according to a first aspect of the present invention includes a chassis; a lower cover member constituting the bottom surface of the chassis; and a foot member projecting from a surface of the lower cover member, wherein the foot member includes a metal core member having a bar shape and extending along one edge of the lower cover member, and a skin member made of rubber or resin, the skin member being provided on a surface of the core member.

According to this structure, the foot member having a bar-shaped metal core member functions not only as a foot of the chassis but also as a reinforcement of the lower cover member. Thus, the foot member can suppress deformation of the lower cover member of the electronic apparatus even when the lower cover member is very thin or made of readily deformable material or when the lower cover member is a flat plate without an upstanding wall on its circumference.

The foot member may have a length in a direction along the one edge, the length being equal to or greater than 50% of the length of the one edge in dimension. With such a length, the foot member effectively functions as a bar-shaped reinforcement that covers a half or more of the lower cover member in length.

The foot member may include a plurality of the foot members aligned in the longitudinal direction along the one edge, and the total length of the respective foot members in the direction along the one edge may be equal to or greater than 50% of the length of the one edge in dimension.

The lower cover member may have a rectangular flat shape having two opposed longer edges and opposed shorter edges shorter than the longer edges, and the foot member may extend along the longer edge.

The lower cover member may have a flat shape having no upstanding wall at least on the one edge of the respective edges thereof, and the foot member may be disposed in a position near the one edge.

The lower cover member may be a flat plate having no upstanding wall on all edges thereof. This enables further reduction in thickness of the lower cover member and the chassis, and the foot member suppresses deformation of the lower cover member.

The foot member may have an arch-like shape that is curved such that the portions thereof, from its middle portion to its respective end portions in the longitudinal direction, descend.

The chassis may have a keyboard device provided on the upper surface thereof, and assuming that a side of the keyboard device, the side being closer to a user of the keyboard device is defined as a front side, and a side farther from the user is defined as a rear side, the one edge may be an edge on the rear side of the chassis.

The chassis may include an upper cover member to which the lower cover member is removably mounted, the lower cover member may have a plurality of engagement hooks provided on its another edge parallel to the one edge, the engagement hooks being aligned in the longitudinal direction of the other edge, the engagement hooks being engageable with engagement portions of the upper cover member when the lower cover member is slid with the other edge as a leading edge, and the foot member may be provided at a position near the one edge.

According to the above-described aspects of the present invention, it is possible to suppress deformation of the lower cover member constituting the bottom surface of the chassis.

DETAILED DESCRIPTION OF THE INVENTION

An electronic apparatus according to the present invention will now be described in detail by way of a preferable embodiment, referring to the attached drawings.

Figure 1:
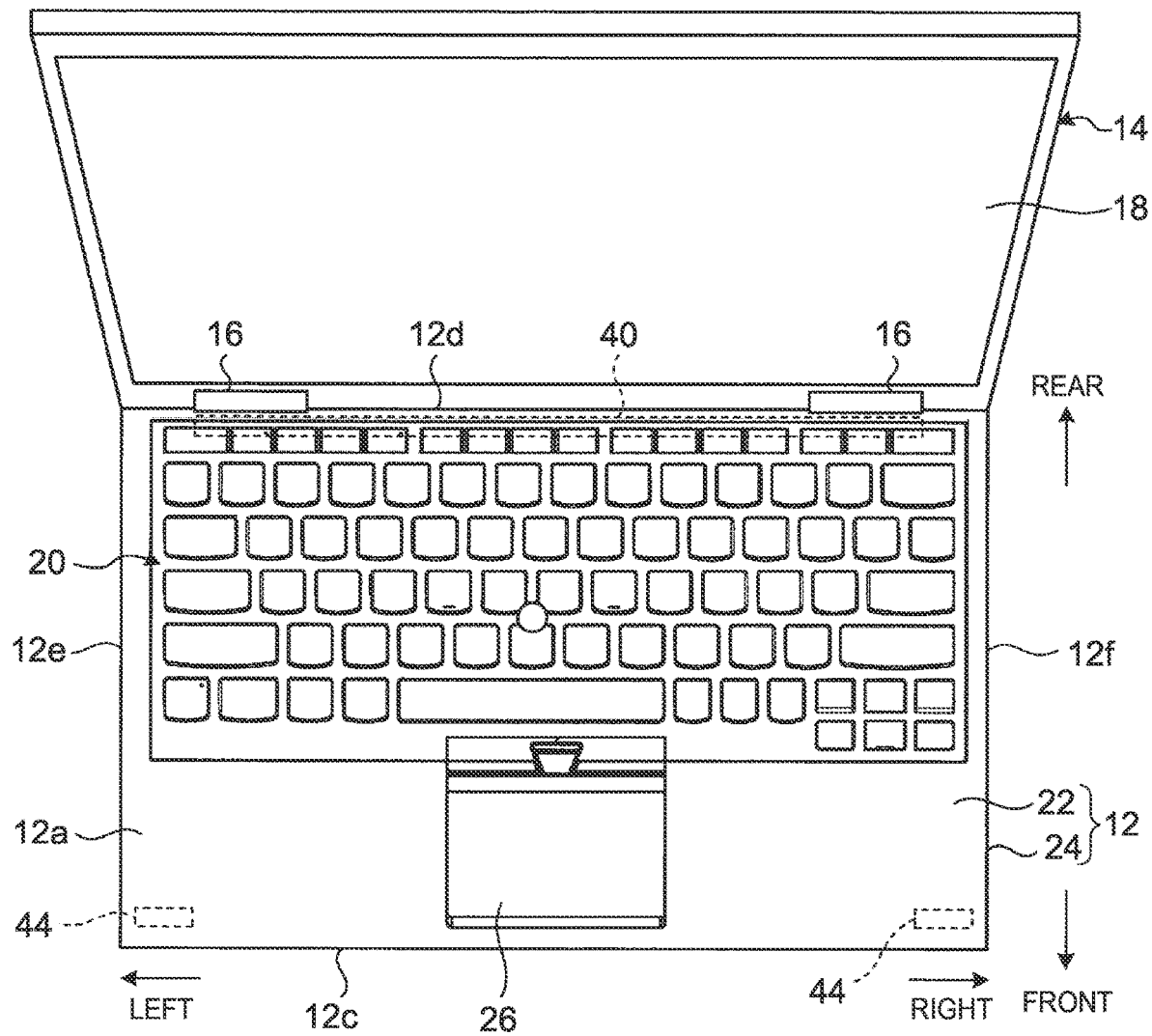
FIG. 1 is a plan view of an electronic apparatus according to an embodiment.

FIG. 1 is a plan view of an electronic apparatus 10 according to an embodiment. As illustrated in FIG. 1, the electronic apparatus 10 in this embodiment is a clamshell-type laptop personal computer (PC) including a chassis 12 and a lid member 14, which are rotatably connected to each other with a hinge 16. The electronic apparatus 10 may be a PC other than a laptop PC, such as a desk-top PC, a tablet PC, or the like.

FIG. 1 illustrates a state in which the lid member 14 is opened from the chassis 12 via the hinge 16 (a use state). In the following, directions relative to the chassis 12 in the state illustrated in FIG. 1 are defined such that a side closer to a user operating a keyboard 20 while looking at a display 18 is defined as a front side, a side farther from the user is defined as a rear side, the thickness direction is defined as the top-bottom direction, and the width direction is defined as the right-left direction.

The lid member 14 is rotatably connected to the rear end portion of the chassis 12 via the hinge 16. The display 18 is, for example, a liquid crystal display.

The chassis 12 is shaped like a low-profile box, and includes an upper cover member 22 and a lower cover member 24, both having a rectangular shape in a plan view, and being placed one on the other in the top-bottom direction and connected to each other. The keyboard 20 is exposed on the upper surface 12a of the chassis 12 in an opening formed on the upper cover member 22. On the upper surface 12a, a touch pad 26 is provided in front of the keyboard 20. Inside the chassis 12, an electronic substrate 28 with a central processing unit (CPU), not illustrated, or the like, mounted thereon (refer to FIG. 2), and various electronic components, such as a battery device, or the like, are stored.

Figure 2:
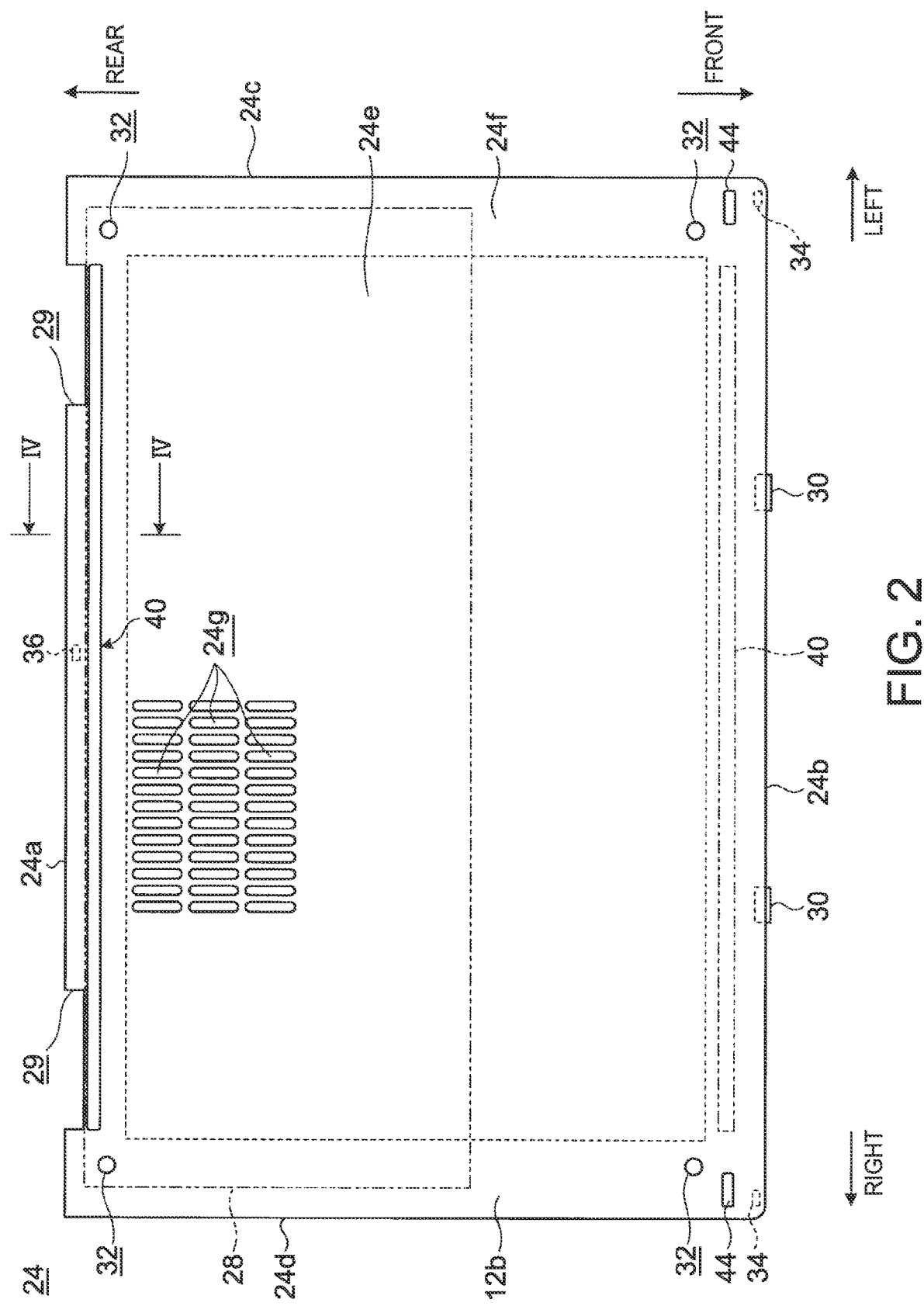
FIG. 2 is a schematic bottom view of a lower cover member.
Figure 3A:
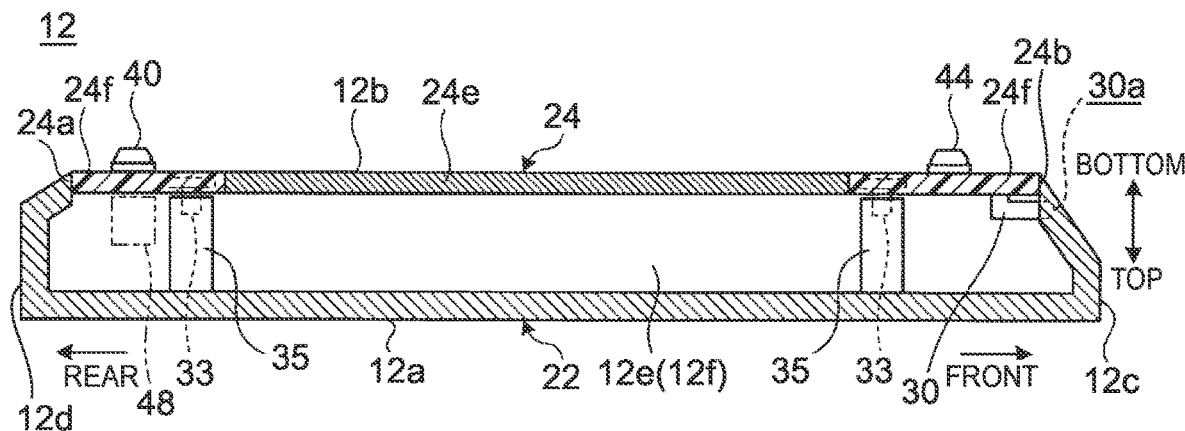
FIG. 3A is a schematic cross sectional side view of a chassis.
Figure 3B:
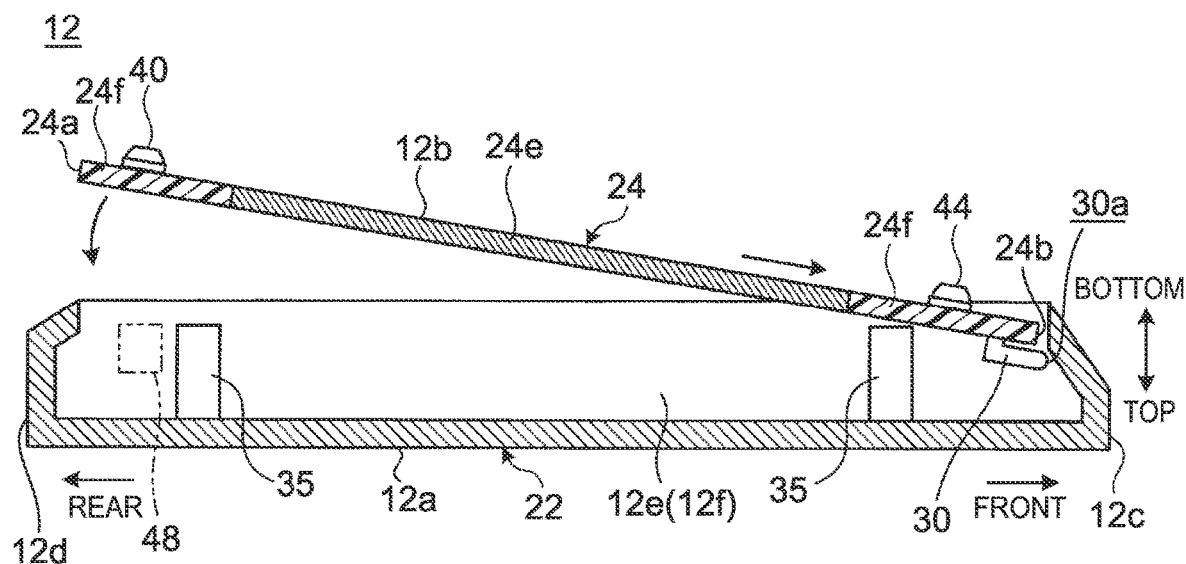
FIG. 3B is a cross sectional side view illustrating a motion of mounting the lower cover member illustrated in FIG. 3A onto an upper cover member.

A specific example structure of the chassis 12 will be described. FIG. 2 is a schematic bottom view of the lower cover member 24. FIG. 3A is a schematic cross sectional side view of the chassis 12. FIG. 3B is a cross sectional side view illustrating a motion of mounting the lower cover member 24, illustrated in FIG. 3A, onto the upper cover member 22. FIG. 3A and FIG. 3B illustrate the chassis 12 upside down.

As illustrated in FIG. 3A and FIG. 3B, the upper cover member 22 is a chassis member that constitutes the surfaces of the chassis 12 other than the bottom surface 12b, that is, the upper surface 12a and the lateral surfaces 12c to 12f on the four circumferential surfaces of the chassis 12, and is shaped like a box with the bottom surface open.

As illustrated in FIG. 2 to FIG. 3B, the lower cover member 24 is a flat plate that is provided so as to close the opening on the bottom surface of the upper cover member 22. The lower cover member 24 in this embodiment does not have an upstanding wall (the lateral surfaces 12c to 12f) on the respective edges 24a to 24d, different from the upper cover member 22. The lower cover member 24 may include an upstanding wall provided on any or all of the edges other than the rear edge 24a, namely, the edges 24b to 24d, of the edges 24a to 24d. The lower cover member 24 has a rectangular flat shape whose opposed edges 24a, 24b correspond to longer edges and another opposed edges 24c, 24d correspond to shorter edges. Reference symbol 29 in FIG. 2 indicates a cut-out portion of the hinge 16 where the chassis is to be fit.

The cover members 22, 24 are made of metal material such as magnesium, aluminum, or the like, ABS resin, glass fiber reinforced resin, carbon fiber reinforced resin, or the like. The shape and material of the upper cover member 22 and the lower cover member 24 are arbitrarily changeable. In this embodiment, the lower cover member 24 has a structure including a base plate 24e made of magnesium alloy and a frame 24f made of glass fiber reinforced resin attached on the circumferential edge portion of the base plate 24e. Inclusion of the base plate 24e makes the lower cover member 24 highly rigid, though the lower cover member 24 is a flat plate without an upstanding wall. The lower cover member 24 includes the frame 24f on the circumference of the base plate 24e, which makes it easier to form an engagement hook 30 and a screw hole 32 to be described later. Reference symbol 24g in FIG. 2 indicates an air intake hole formed on the lower cover member 24, through which a fan device, not illustrated, inside the chassis 12 sucks outside air, and which includes, for example, a plurality of slits aligned.

The lower cover member 24 is removably secured on the upper cover member 22 with a plurality of engagement hooks 30 provided on the front edge 24b and screws 33 passing through the screw holes 32 provided at four corners. A pair of the engagement hooks 30 is provided, for example, such that each engagement hook 30 is provided on each of the right and left sides of the middle portion of the front edge 24b of the lower cover member 24. Each engagement hook 30 is a prong member having a substantial L-shape in a side view, including a projection projecting upward from the inner surface of the lower cover member 24 and then bent forward (refer to FIG. 3A and FIG. 3B). The engagement hook 30 is removably engageable with a concave engagement portion 30a formed on the inner surface of the front surface 12c of the upper cover member 22. The screw 33 passes through the screw hole 32 of the lower cover member 24 to be threaded into a female screw provided on a boss portion 35, for example, formed on the inner surface of the upper cover member 22.

The lower cover member 24 in this embodiment includes a small engagement hook 34 on each of the right and left end portions of the front edge 24b. Similar to the engagement hook 30, the engagement hook 34 is removably engageable with a concave engagement portion formed on the inner surface of the front surface 12c. The disposition and number of engagement hooks 34 may be arbitrarily changed. The engagement hook 34 is omissible.

As illustrated in FIG. 3B, the lower cover member 24 is slid forward with the front edge 24b as a leading edge whereby the engagement hook 30 (34) is engaged with the engagement portion 30a. Further, the screw 33 is thereafter fastened, whereby the lower cover member 24 is secured on the upper cover member 22.

Note that the lower cover member 24 in this embodiment includes an engagement hook 36 also at a position near the middle of the rear edge 24a. The engagement hook 36 is an elastic piece, for example, projecting from the inner surface of the lower cover member 24 and having a claw portion at its leading end portion. The engagement hook 36 is removably engageable with the engagement portion on the side of the upper cover member 22 through a sole movement of the lower cover member 24 in the top-bottom direction, not requiring sliding in the front-rear direction. The engagement hook 36 is omissible.

Here, the lower cover member 24 in this embodiment is a flat plate without an upstanding wall at all or at least on the rear edge 24a. Thus, the lower cover member 24 possibly warps and deforms partially because of its thin thickness even if the base plate 24e is made of highly rigid material, as described above. Note that the rear edge 24a and the front edge 24b of the lower cover member 24, both extending in the right-left direction, are longer than the side edges 24c, 24d extending in the front-rear direction. Thus, similar to the reference example illustrated in FIG. 7, there is a concern that the lower cover member 24 deforms such that its middle portion in the right-left direction curves to be convex or concave, which causes the right and left side edges 24c, 24d to be displaced or warped in the top-bottom direction.

Figure 4:
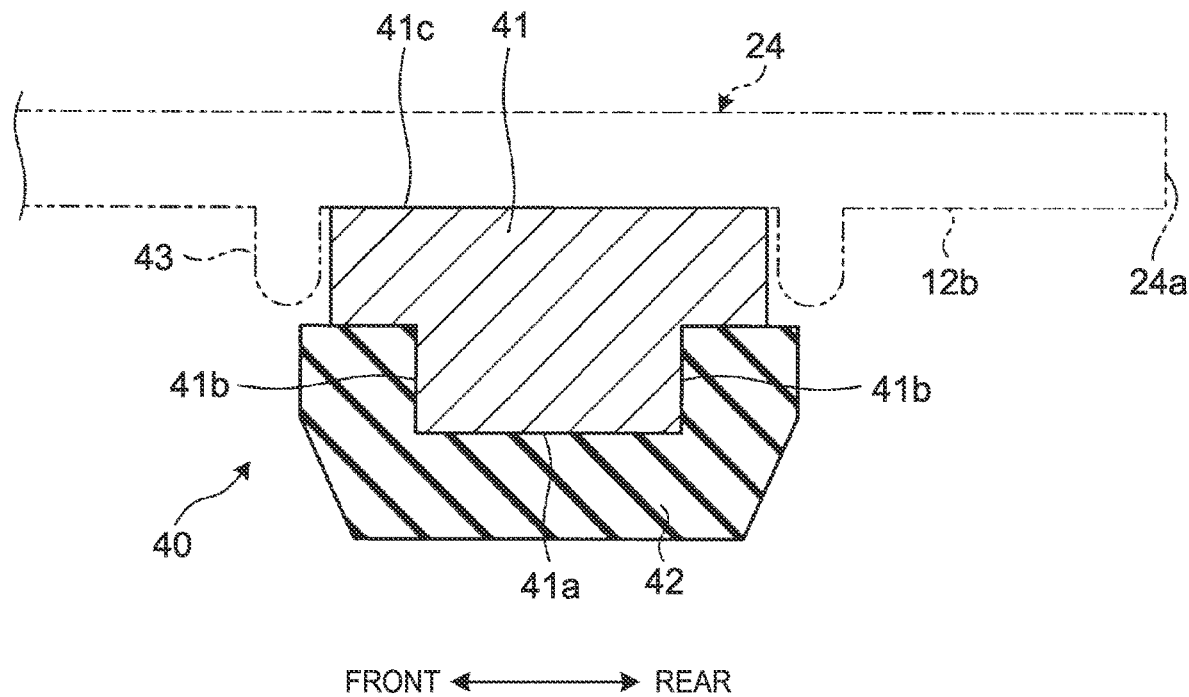
FIG. 4 is a schematic cross sectional view along line IV-IV in FIG. 2.
Figure 5:
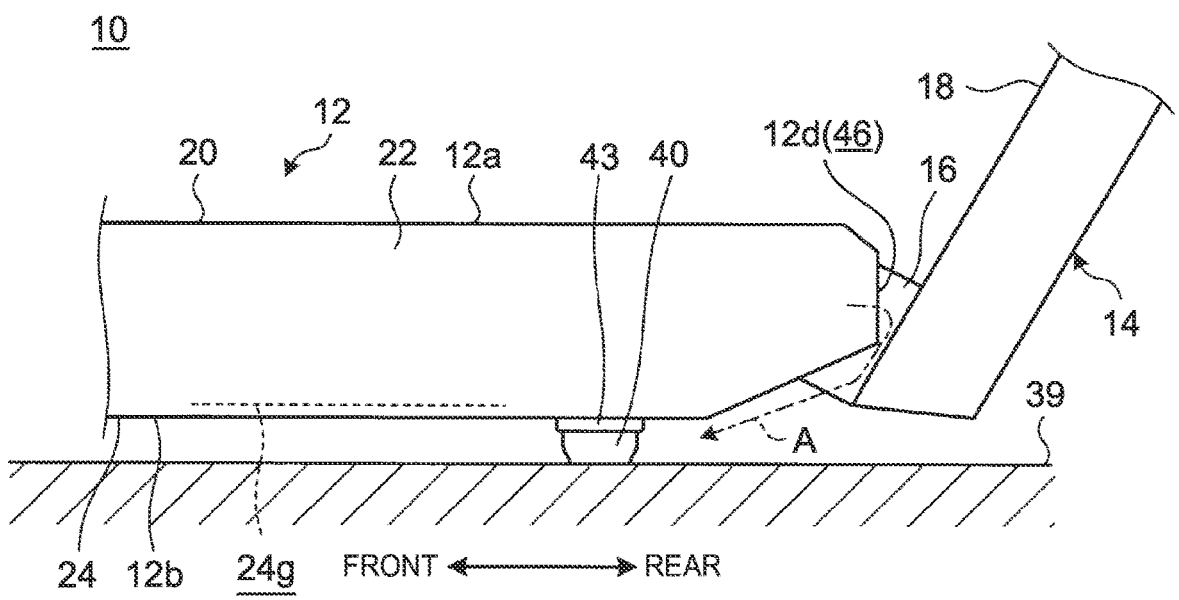
FIG. 5 is an enlarged schematic side view of a rear end portion of the electronic apparatus in a use state and a portion thereabout.

In view of the above, the electronic apparatus 10 in this embodiment includes a foot member 40 that functions as a reinforcement. FIG. 4 is a schematic cross sectional view along line IV-IV in FIG. 2. FIG. 5 is an enlarged schematic side view of the rear end portion of the electronic apparatus 10 and a portion thereabout in the use state.

As illustrated in FIG. 4 and FIG. 5, the foot member 40 is secured on the surface (the bottom surface 12b) of the lower cover member 24 and projects downward. As illustrated in FIG. 2 to FIG. 4, the foot member 40 is mounted at a position slightly in front of and near the rear edge 24a and has a bar shape extending along the rear edge 24a in the right-left direction. In the example structure illustrated in FIG. 2, the foot member 40 extends between the right and left cut-out portions 29, 29.

As illustrated in FIG. 4, the foot member 40 includes a core member 41 and a skin member 42. Reference symbol 43 in FIG. 4 indicates a rib that protrudes slightly from the surface of the lower cover member 24 and surrounds the circumference of the foot member 40. The rib 43 is omissible. The foot member 40 is secured on the surface of the lower cover member 24 via adhesive agent, a double stick tape, a screw, or the like.

The core member 41 is a member that serves as an aggregate of the foot member 40, and extends along the rear edge 24a of the lower cover member 24. The core member 41 is a bar member made of metal, such as aluminum, stainless, or the like, for example, and has high rigidity. The core member 41 has, for example, a downward convex cross sectional shape, and extends over the substantially entire length of the foot member 40 in the longitudinal direction. The core member 41 may have, for example, a square or rectangular cross sectional shape. The core member 41 is required to function as a reinforcement to suppress or correct deformation of the lower cover member 24. Thus, it is preferred that the core member 41 is larger in height and width than the plate of the lower cover member 24 to have a higher section modulus to obtain higher rigidity so that deformation of the lower cover member 24 can be suppressed.

The skin member 42 constitutes an abutment portion which abuts on a placement surface 39. The skin member 42 is provided covering the lower surface 41a and the front and rear lateral surfaces 41b included in the entire surface of the core member 41. Alternatively, the skin member 42 may cover only the lower surface 41a of the core member 41. Note that the upper surface 41c of the core member 41, which is not covered with the skin member 42, constitutes a surface to be secured on the lower cover member 24.

The skin member 42 is made of rubber material or resin material having some flexibility or cushioning property, so that the skin member 42 functions as a cushion for the electronic apparatus 10 to be placed on the placement surface 39 to suppress generation of an impact or abnormal sounds, and further to suppress damage to the lower cover member 24 or the placement surface 39. For example, preferably, the skin member 42 is secured on the core member 41 through insert molding, adhesion, or the like. The skin member 42 may be formed by applying rubber material or the like (for example, rubber paint) to the core member 41. Note that the skin member 42 covers the right and left end faces of the core member 41, besides the lower surface 41a and the lateral surfaces 41b.

Figure 6:
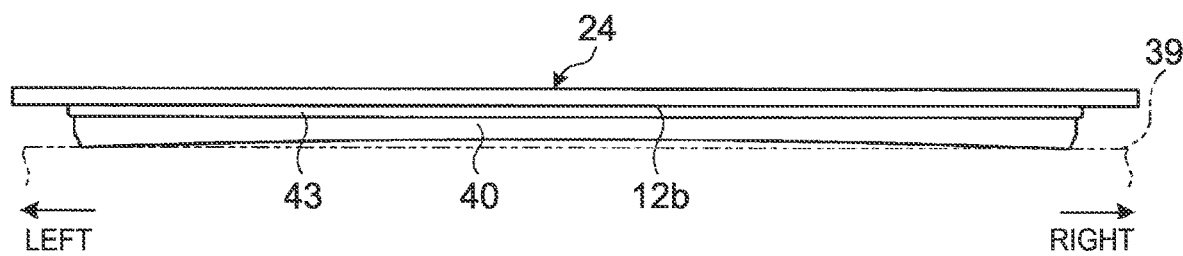
FIG. 6 is a schematic front view of the lower cover member and a foot member.

As illustrated in FIG. 6, it is preferred that the foot member 40 has an arch-like shape that is curved such that its portions from the middle to the respective end portions in the longitudinal direction descend. The foot member 40 is set such that the height of the top point of the arch, that is, the gap between the middle portion and the placement surface 39, is as small as about 0.1 to 0.2 mm, for example. Having such an arch-like shape, the foot member 40 is reliably in contact with the placement surface 39 at two points on its right and left end portions and thereby stabilized. That is, as the foot member 40 has a long bar shape, placement of the foot member 40 on the placement surface 39 such that the foot member 40 abuts over its full length will highly likely result in the foot member 40 abutting in an inclined posture relative to the placement surface 39 and thus wobbling due to manufacturing errors or distortion or the like of the placement surface 39. In view of the above, the foot member 40 in this embodiment has an arch-like shape that abuts on the placement surface 39 at two right and left points. This makes the electronic apparatus 10 stabilized on the placement surface 39 and thereby suppresses wobbling.

As illustrated in FIG. 2, a pair of right and left front foot members 44 is additionally provided on the front edge portion of the surface of the lower cover member 24. The front foot members 44 each have a bar shape shorter than the foot member 40, and are provided on the respective right and left end portions slightly rearward than the front edge 24b of the lower cover member 24. Each front foot member 44 may have the same structure as that of the foot member 40 or may include a resin core member instead of the metal core member 41. Alternatively, the front foot member 44 may be a rubber block or the like without the core member 41.

As described above, the electronic apparatus 10 includes the foot member 40 on the surface of the lower cover member 24 that constitutes the bottom surface 12b of the chassis 12. Each foot member 40 includes the metal core member 41 having a bar shape and extending along one edge of the lower cover member 24, and the rubber or resin skin member 42 covering the surface of the core member 41.

Therefore, the foot members 40 of the electronic apparatus 10, including a bar-shaped metal core member 41 function not only as the feet of the chassis 12 but also as bar reinforcements that reinforce the lower cover member 24. Thus, the electronic apparatus 10 is suppressed from warping and deforming with the foot members 40 even in the case where the lower cover member 24 is very thin or made of readily deformable material or in the case where the lower cover member 24 is shaped like a flat plate without an upstanding wall on its circumference (refer to FIG. 6). Moreover, as the foot members, which are indispensably provided on the bottom surface of the chassis of the electronic apparatus 10, are used also as reinforcements, the electronic apparatus 10 does not require separate reinforcements of the lower cover member 24, which suppresses increase in the number of components and manufacturing costs. Further, as the foot members 40 are provided on the bottom surface 12b, similar to the feet normally provided, the design of the bottom surface is not impaired. Further, as the electronic apparatus 10 does not require separate reinforcements to be provided on the inner surface of the lower cover member 24, for example, the inner surface of the lower cover member 24 is free from projections of reinforcements, which contributes to reduction in thickness of the chassis 12.

In particular, although the lower cover member 24 in this embodiment is shaped like a flat plate, and this shape makes the lower cover member 24 readily warped and deformed, though the shape contributes to reduction in thickness of the lower cover member 24 itself and the chassis 12, the lower cover member 24 of the electronic apparatus 10 is less deformable as the foot member 40 includes the rigid core member 41. Also, reduction in thickness of the chassis 12 is not hindered.

In the example structure illustrated in FIG. 2, the foot member 40 is disposed near the rear edge 24a. Alternatively, the foot member 40 may be disposed near and along the front edge 24b (refer to the foot member 40 illustrated with a two-dot chain line in FIG. 2). A pair of foot members 40 may be provided along the rear edge 24a and along the front edge 24b.

Figure 7:
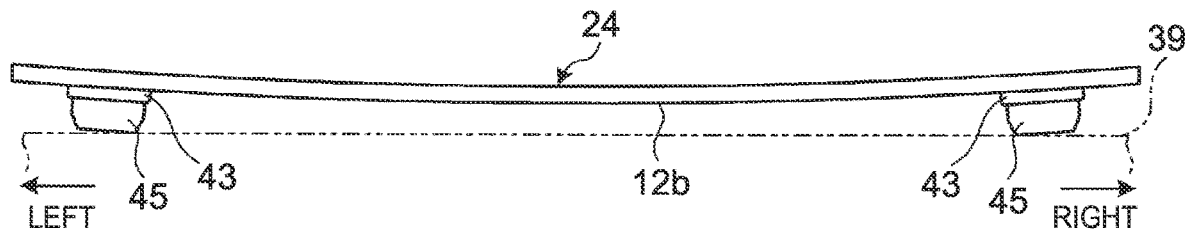
FIG. 7 is a schematic front view of a lower cover member having a shorter foot member in a reference example.

If the rear foot member 40 is a short foot member 45 having a structure similar to that of the front foot member 44, as illustrated in the reference example illustrated in FIG. 7, warped deformation is a concern. Note that, in the case where the core member 41 is made of less rigid resin or the like, provision of the foot member 40 over the substantially entire length of the rear edge 24a does not produce a substantial effect of suppressing warped deformation as the foot member 40 deforms together with the lower cover member 24.

As the foot member 40 that is too short like the short foot member 45 illustrated in the reference example illustrated in FIG. 7 does not produce an effect as a reinforcement, it is preferred that the foot member 40 has a length equal to or longer than 50% of the length of the rear edge 24a, which is parallel to the foot member 40, in order to obtain some extent of effect of suppressing warped deformation. In the example structure illustrated in FIG. 2, the foot member 40 has a length equal to about 80% of the length of the rear edge 24a.

As the foot member 40 is provided straddling the middle portion of the lower cover member 24 in the right-left direction, warped deformation of the lower cover member 24 with the middle portion as the center of bending can be effectively suppressed. Moreover, the foot member 40 is provided straddling the air intake hole 24g in the right-left direction, as illustrated in FIG. 2. The air intake hole 24g is a hole, and thus locally decreases the rigidity of the lower cover member 24. Thus, the foot member 40 straddling the air intake hole 24g can further effectively suppress warped deformation of the lower cover member 24.

As illustrated in FIG. 5, the foot member 40 has a longitudinal structure extending in the right-left direction. Thus, the foot member 40 constitutes a wall extending in the right-left direction in an area near the rear end portion of the bottom surface 12b of the chassis 12. With the above, in the case where the electronic apparatus 10 has a discharge hole 46 on the rear surface 12d of the chassis 12, a situation in which the hot air A discharged from the discharge hole 46 hits against the lid member 14 and flows toward the bottom surface 12b is suppressed with the foot member 40 in the electronic apparatus 10. Consequently, the electronic apparatus 10 can suppress a situation in which discharged air A is sucked again through the air intake hole 24g provided to suck outside air, which increases cooling efficiency. In the above, as the extent of the curve of the arch-like shape of the foot member 40 is very small, as described above, the influence caused by the air A, illustrated in FIG. 5, passing through the gap between the foot member 40 and the placement surface 39 is very small.

Figure 8:
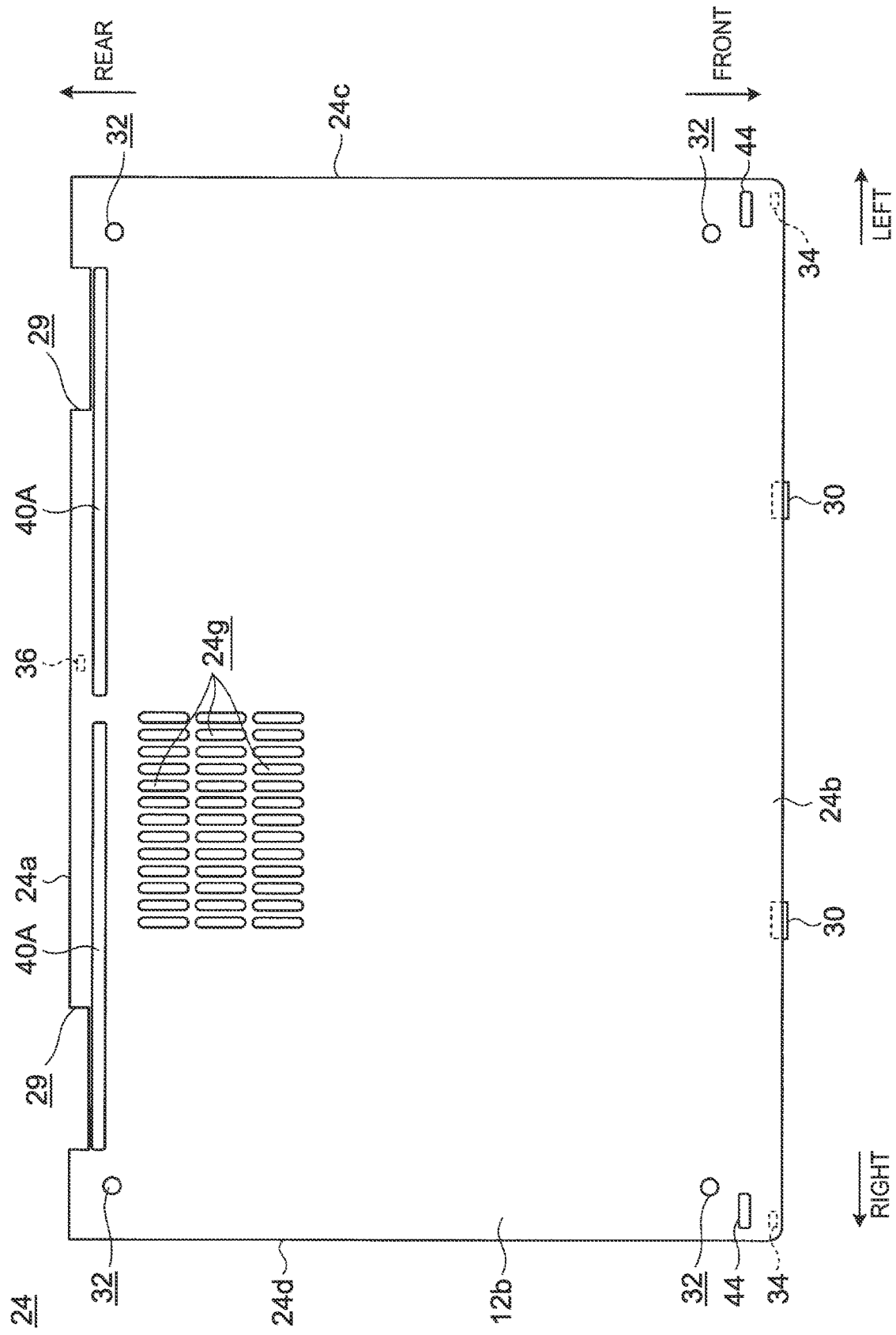
FIG. 8 is a schematic bottom view of a lower cover member having a foot member according to a modified example.

A plurality of the foot members 40 may be provided so as to function as a single reinforcement. For example, as illustrated in FIG. 8, the foot member 40 may be replaced by a structure including foot members 40A as short as a half of the foot member 40, aligned in the right-left direction, or in the longitudinal direction. Each foot member 40A has a similar structure to that of the foot member 40 except its length. Three or more foot members 40A may be aligned. In this structure, it is preferred that the total length of two foot members 40A aligned in the longitudinal direction is equal to or longer than 50% of the length of the rear edge 24a.

The core member 41 of the foot member 40 in this embodiment is made of metal, such as aluminum or the like, having a high heat conductive rate. With the above, the foot member 40 can absorb and diffuse the heat from a heating element other than the CPU, housed in the chassis 12, for example, a DC-DC converter, a solid state drive (SSD), an image processing chip, or the like through the core member 41, so that generation of a local high-temperature portion on the surface of the lower cover member 24 can be suppressed. Moreover, the core member 41 of the foot member 40 may be made of magnetized material. With the above, the foot member 40 is attracted by a magnet 48 (refer to FIG. 3A and FIG. 3B) provided, for example, on the side of the upper cover member 22. Consequently, the rear edge 24a of the lower cover member 24 can be stably mounted on the upper cover member 22 even if the engagement hook 34 is omitted.

Note that the present invention is not limited to the above-described embodiment. Needless to say, the present invention can be freely modified within a range not departing from the gist of the present invention.

Although a structure in which the foot member 40 is disposed parallel to the edges 24a, 24b, or the longer edges of the lower cover member 24, is described as an example, the foot member 40 may be disposed slightly diagonally relative to the edges 24a, 24b. Alternatively, the foot member 40 may be disposed along the edges 24c, 24d, or the shorter edges.

The invention claimed is:

1. An electronic apparatus, comprising:
a chassis;
a lower cover member constituting a bottom surface of the chassis; and
a foot member projecting from a surface of the lower cover member,
wherein
the foot member includes:
a T-shaped metal core member that has a cross-bar portion and a post portion, the cross-bar portion having an upper planar surface that extends along and contacts one planar edge of the lower cover member, the post portion having a planar lower surface and a lateral surface, and
a skin member made of rubber or resin, the skin member contacting the lower surface and the lateral surface of the post portion and contacting a surface of the cross-bar portion that is opposite the upper surface of the cross-bar portion.

2. The electronic apparatus according to claim 1, wherein the foot member has a length in a direction along the one planar edge, the length being equal to or greater than 50% of a length of the one planar edge.

3. The electronic apparatus according to claim 1, further comprising:
- a plurality of the foot members aligned in a longitudinal direction along the one planar edge, and
- a total length of the plurality of foot members in the longitudinal direction along the one planar edge is equal to or greater than 50% of a length of the one planar edge.

4. The electronic apparatus according to claim 1, wherein
- the lower cover member has a rectangular flat shape having two opposed longer edges and two opposed shorter edges shorter than the longer edges, and
- the foot member extends along the longer edge.

5. The electronic apparatus according to claim 1, wherein
- the lower cover member has a flat shape having no upstanding wall at least on the one planar edge, and
- the foot member is disposed near the one planar edge.

6. The electronic apparatus according to claim 5, wherein the lower cover member is a flat plate having no upstanding wall on all edges thereof.

7. The electronic apparatus according to claim 1, wherein the foot member has an arch-like shape that is curved such that portions thereof, from a middle portion thereof to respective end portions thereof, in a longitudinal direction, descend.

8. The electronic apparatus according to claim 1, wherein
- the chassis has a keyboard device on an upper surface thereof, and
- the one planar edge is an edge on a rear side, away from the user, of the chassis.

9. The electronic apparatus according to claim 1, wherein
- the chassis includes an upper cover member to which the lower cover member is removably mounted,
- the lower cover member has a plurality of engagement hooks on another edge thereof which is parallel to the one planar edge, the engagement hooks are aligned in a longitudinal direction of the other edge, the engagement hooks are engageable with an engagement portion of the upper cover member when the lower cover member is slid with the other edge as a leading edge, and
- the foot member is at a position near the one planar edge.

* * * * *